(No Model.)
C. A. BAUER.
HARVESTER SEAT.
No. 476,238.    Patented June 7, 1892.
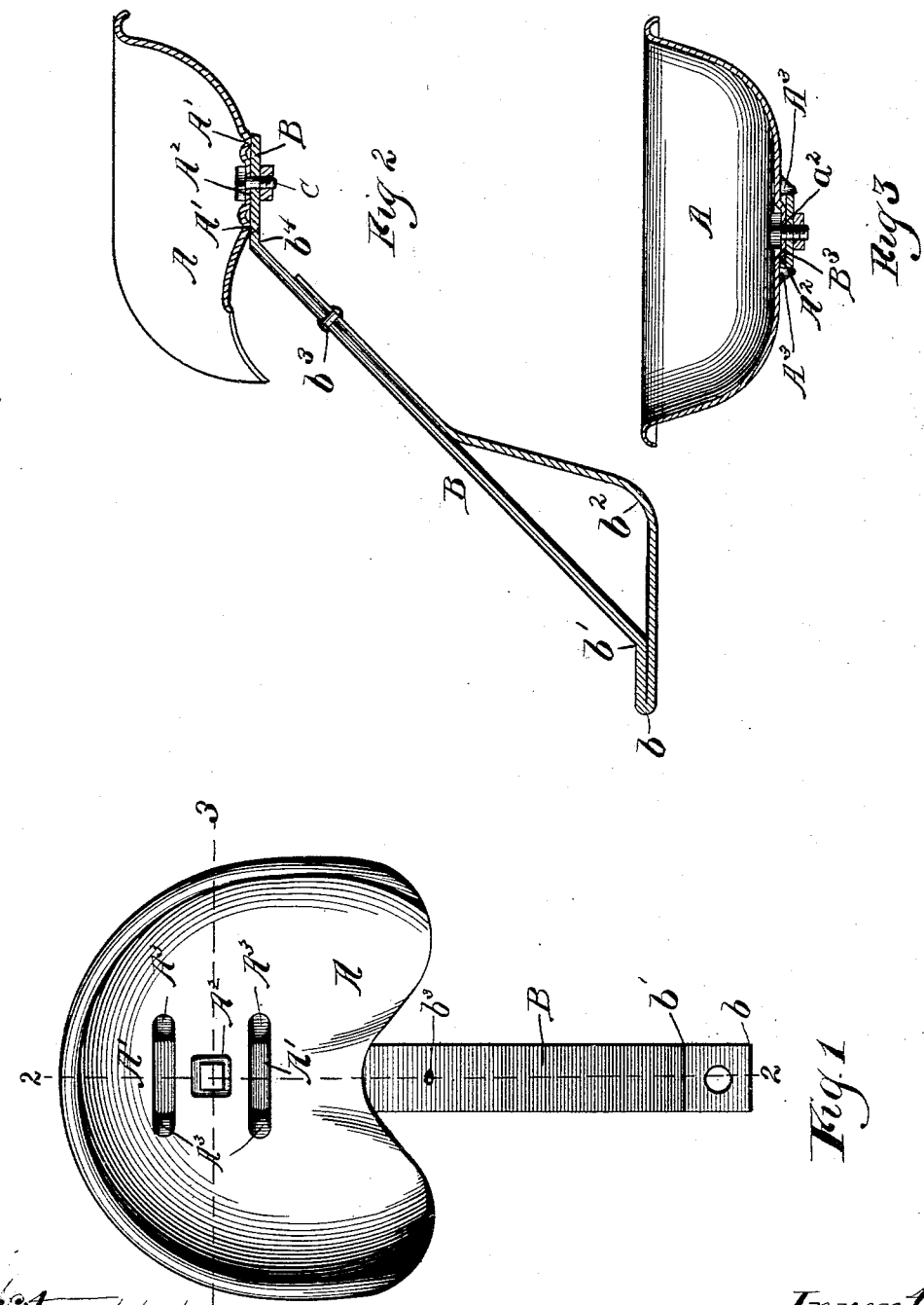
Witnesses.
J. L. Tunison
Jean Elliott
Inventor:
Charles A. Bauer
By Burton and Burton
his attorneys
THE NORRIS PETERS CO., PHOTO-LITHO., WASHINGTON, D. C.

UNITED STATES PATENT OFFICE.

CHARLES A. BAUER, OF SPRINGFIELD, OHIO, ASSIGNOR TO THE WARDER, BUSHNELL & GLESSNER COMPANY, OF SAME PLACE.

HARVESTER-SEAT.

SPECIFICATION forming part of Letters Patent No. 476,238, dated June 7, 1892.

Application filed January 13, 1892. Serial No. 417,910. (No model.)

*To all whom it may concern:*

Be it known that I, CHARLES A. BAUER, a citizen of the United States, residing at Springfield, county of Clark, and State of Ohio, have invented certain new and useful Improvements in Harvester-Seats, which are fully set forth in the following specification, reference being had to the accompanying drawings, forming a part thereof.

The purpose of this invention is to provide a driver's seat for a harvester which may be made out of sheet metal formed in a die, whereby it may be made lighter and tougher than the customary cast-iron seat and without incurring the defect which exists in all seats heretofore made of sheet metal—viz., that they are difficult to secure rigidly to a support, and even when rigidly secured are exceedingly liable to be broken through at the points of fastening by the strain of use. These defects are overcome in the present metal seat, which is shown in the drawings, wherein—

Figure 1 is a plan of such seat and its support. Fig. 2 is a section fore and aft at the line 2 2 on Fig. 1. Fig. 3 is a transverse section at the line 3 3 on Fig. 1.

A is the seat; B, the seat-support, of familiar form, consisting of a flat steel bar bent upon itself at the point $b$, one member being bent at $b'$ to extend obliquely upward at an angle of about forty-five degrees, while the other member, extending horizontally for a greater distance to form a foot, is then bent up at the point $b^2$ to brace the principal member first-mentioned, to which it is secured at $b^3$, the principal member being bent horizontally at $b^4$, the horizontal portion $B^3$ forming the immediate fastening for the seat.

The seat A, made, as stated, from a sheet-metal blank by being pressed in a die, has the usual configuration of a seat, which need not be particularized; but the peculiar features of its form, by which it is relieved of the defects of ordinary pressed-metal seats, relate to the form at the portion where the junction is made with the support B—that is to say, with the horizontal portion $B^3$ of said support. If the sheet metal of the seat at the place where the supporting-strap $B^3$ is applied to it had a plain surface in the first place, it would be necessary to secure it by more than one bolt in order that it might be fixed in position, and, secondly, when so secured or in any other manner provided against turning about its fastening-bolt the rocking strain experienced in driving would cause the plain sheet metal to spring more or less, and the result of the constant springing back and forth of the metal under such strain would be to crack it around the heads of the bolts or rivets where the strain would be concentrated, and even before this result should be produced, and even if the metal were sufficiently tough to prevent this result the metal would be stretched more or less at the point where it was bound by the heads of the rivets, and the seat would have a rocking movement on its support very uncomfortable to the rider and greatly increasing the strain upon the metal at the points of fastening. To prevent such action and at the same time avoid the necessity for making more than one hole through the metal of the seat or providing more than one fastening-bolt, I strike the metal down from the upper side to form two embossed ribs $A'$ $A'$, extending transversely to the direction of travel, one in front of and one behind the point at which the fastening-bolt C is to be applied and at about equal distances therefrom, and at the point where I intend to apply such bolt I strike the metal down to form a boss $A^2$, which protrudes downward from the lower side of the seat almost to the same height as the ribs $A'$, and at the center of these ribs I pierce the metal, forming the bolt-hole $a^2$. It will be evident now that when this bolt is inserted through this hole and through the supporting-bar said bar, extending across and bearing upon the ribs $A'$, and said bolt drawn tight the fore-and-aft rocking to which the seat is subjected and the strain that is thereby put upon the bolt, instead of operating as over a fulcrum formed by the edge of the bolt-head or nut on the metal and with a leverage equal to the whole distance from the bolt to the edge of the seat, where the weight of the rider may rest, operates over a fulcrum formed by either of the ribs $A'$ at quite an appreciable distance from the bolt, and therefore with very much less effect, to bend or crack the metal of the seat at the bolt-head, and, furthermore, that the bolt, being tightened midway between the two ribs, holds the seat securely against rocking on its support, particularly because the ribs, as well as the boss $B^3$, so stiffen the metal as to prevent it being stretched and bulged downward at the area of fastening, as it would be if it were flat and similarly fastened.

In order to prevent the seat from having an opportunity to turn on its fastening-bolt, I strike down the lugs $A^3 A^3 A^3 A^3$, one at each end of each of the ribs $A'$, which forms the seat for the supporting-bar. These lugs $A^3$ may be formed without severing the metal, if desired, and such a mode of formation is somewhat to be preferred; but even if the metal is severed at the line at which the lateral edge of the supporting-bar abuts against these lugs $A^3$ the entire effect of the presence of the lugs is to stiffen the seat and strengthen it more than it is weakened by the rupture of the metal, because said lugs may be formed with comparatively long slope upon the outer side— that is, at the ends of the ribs $A'$—whereby they are, as it were, against the edges of the supporting-bar.

It is not essential that the entire number of lugs $A^3$ shown should be used, since, in combination with the central bolt, any two of said lugs, provided they are not diagonally opposite, will be sufficient to prevent rotation of the seat about the bolt; but the entire number gives greater security and are as easily provided as a lesser number.

It will be apparent that the lugs $A^3$ are not necessarily struck in the line of the ribs $A'$; but the danger of rupturing the metal in striking such lugs is diminished and the effectiveness of the lugs themselves somewhat increased by being formed as shown.

I claim—

1. A harvester-seat formed of sheet metal, pressed into shape and provided with downwardly-embossed ribs $A'$ and intermediate them a downwardly-embossed bolt-seat $A^2$, in combination with the seat-support extending across and obtaining bearing on said ribs, and the bolt C, clamping the seat to the support at such bolt-seat, substantially as set forth.

2. A harvester-seat formed of sheet metal pressed into shape, having the downwardly-embossed ribs $A' A'$, forming a bearing for its support on the under side, and the downwardly-embossed stop-lugs $A^3$, combined with the supporting-bar resting upon the ribs and between said stop-lugs, and the clamping-bolt inserted through the seat and support intermediate the ribs, substantially as set forth.

3. A harvester-seat formed of sheet metal pressed into shape, and having downwardly-embossed ribs $A' A'$ and intermediate them the downwardly-embossed bolt-seat $A^2$ and at the ends of the ribs the downwardly-embossed stop-lugs $A^3$, combined with the seat-support extending across and bearing upon the ribs between the stop-lugs, and the clamping-bolt binding the seat to the support at the said bolt-seat, substantially as set forth.

In testimony whereof I have hereunto set my hand, this 7th day of January, 1892, in the presence of two witnesses, at Chicago, Illinois.

CHARLES A. BAUER.

Witnesses:
 ANDREW STARK,
 CHAS. S. BURTON.